United States Patent
Takazawa et al.

(10) Patent No.: US 8,996,276 B2
(45) Date of Patent: Mar. 31, 2015

(54) VEHICLE DRIVING SUPPORT CONTROL APPARATUS

(75) Inventors: Atsuyoshi Takazawa, Tokyo (JP); Norimasa Kaneko, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 818 days.

(21) Appl. No.: 12/898,158

(22) Filed: Oct. 5, 2010

(65) Prior Publication Data

US 2011/0098927 A1 Apr. 28, 2011

(30) Foreign Application Priority Data

Oct. 22, 2009 (JP) .................................. 2009-243694

(51) Int. Cl.
*B60W 30/165* (2012.01)
*G08G 1/16* (2006.01)
*B60W 30/16* (2012.01)

(52) U.S. Cl.
CPC ............... *G08G 1/161* (2013.01); *B60W 30/16* (2013.01)
USPC .................... 701/98; 701/93; 701/96; 701/97; 701/300; 701/301

(58) Field of Classification Search
USPC .............. 180/170, 178; 701/93, 96, 117, 300, 701/301, 97, 98
See application file for complete search history.

(56) References Cited

U.S. PATENT DOCUMENTS

| | | | | |
|---|---|---|---|---|
| 5,959,569 A | * | 9/1999 | Khodabhai | 342/70 |
| 5,969,969 A | * | 10/1999 | Ejiri et al. | 701/41 |
| 6,269,308 B1 | * | 7/2001 | Kodaka et al. | 701/301 |
| 6,330,511 B2 | * | 12/2001 | Ogura et al. | 701/301 |
| 2002/0177953 A1 | * | 11/2002 | Okamura et al. | 701/301 |
| 2002/0198660 A1 | * | 12/2002 | Lutter et al. | 701/301 |
| 2003/0195704 A1 | * | 10/2003 | Sekiguchi | 701/301 |
| 2004/0078133 A1 | * | 4/2004 | Miller et al. | 701/96 |
| 2005/0225457 A1 | * | 10/2005 | Kagawa | 340/995.13 |
| 2006/0095195 A1 | * | 5/2006 | Nishimura et al. | 701/96 |
| 2007/0005218 A1 | * | 1/2007 | Ueyama | 701/96 |

FOREIGN PATENT DOCUMENTS

JP 2006-195641 7/2006

* cited by examiner

*Primary Examiner* — Stephen Holwerda
(74) *Attorney, Agent, or Firm* — Smith, Gambrell & Russell, LLP

(57) ABSTRACT

When a stereo image recognition device detects a vehicle ahead, a driving support apparatus extracts the vehicle ahead as a vehicle against which control should be performed, and performs driving support control based upon the information from the stereo image recognition device. When the stereo image recognition device does not detect the vehicle ahead, the driving support apparatus sets either one of the distance from the driving lane on which the vehicle travels and a start point of a curve ahead according to the configuration of the road ahead and a detection limit distance of the information of the vehicle ahead by the stereo image recognition device (front recognition device) as a threshold value IVC_L. When the vehicle ahead is present distant by more than the threshold value IVC_L, the driving support apparatus performs driving support control based upon the information by the inter-vehicle communication from a communication device.

9 Claims, 6 Drawing Sheets

VEHICLE DRIVING SUPPORT CONTROL APPARATUS

CROSS-REFERENCE TO RELATED APPLICATIONS

The present application claims priority from Japanese Patent Application No. 2009-243694 filed on Oct. 22, 2009, and is hereby incorporated by reference in its entirety.

BACKGROUND OF THE INVENTION

1. Field of the Invention

The present invention relates to a vehicle driving support control apparatus that accurately selects a vehicle ahead, which is a subject against which control should be performed, by utilizing vehicle-ahead information detected by a detection sensor, such as a front image recognition device, mounted to the vehicle, and vehicle information detected by inter-vehicle communications, in order to perform a driving support.

2. Description of Related Art

In recent years, various driving support apparatuses have been proposed for a vehicle, in which a front environment is monitored based upon information acquired from an ITS (Intelligent Transport Systems), inter-vehicle communication system, onboard image processing system, radar apparatus and the like, in order to achieve safety driving. These apparatuses have been commercially available.

For example, Japanese Patent Application Laid-Open No. 2006-195641 discloses a vehicle information providing apparatus. In the vehicle information providing apparatus, a multilevel indicating the number of detecting units, including an obstacle sensor, vehicle roadside communication and inter-vehicle communication, when each of the detecting unit detects the same object, and a sum of reliability set to the detecting units detecting the object are obtained, and a total reliability is determined based upon these factors. As the reliability is predicted to be higher from the total reliability, a driving support having higher level is executed.

However, when an obstacle, which is a subject against which control should be performed, is determined with the reliability set separately due to the difference of the detecting units as disclosed in Japanese Patent Application Laid-Open No. 2006-195641, the difference in the detecting units for detecting an obstacle is reflected on the control, but the actual driving condition and the difference in the driving environment is not reflected thereon. Therefore, a driver using the technique feels a sense of discomfort for the control, which entails a problem that usability is poor.

SUMMARY OF THE INVENTION

The present invention is accomplished in view of the above-mentioned circumstance, and aims to provide a vehicle driving support control apparatus that precisely extracts a vehicle ahead, which is a subject against which control should be performed, by suitably reflecting a difference in detecting units detecting vehicle information and a difference in an actual driving condition and driving environment, thereby being capable of performing natural driving support with no sense of discomfort.

The present invention includes a first vehicle information detecting unit that acquires vehicle information around an own vehicle by inter-vehicle communication; a second vehicle information detecting unit that detects vehicle ahead vehicle information by a front information detecting unit mounted to a vehicle other than the inter-vehicle communication; a second driving support control unit that, when the second vehicle information detecting unit detects a vehicle ahead, extracts the vehicle ahead as a vehicle against which control should be performed, and performs driving support control based upon the information from the second vehicle information detecting unit; and a first driving support control unit that, when the second vehicle information detecting unit does not detect a vehicle ahead, sets either one of a distance to a start point of a curve ahead and a detection limit distance of vehicle ahead information by the second vehicle information detecting unit as a threshold value according to the configuration of the driving lane on which the own vehicle travels and the configuration of the road ahead, and when the vehicle ahead is distant by more than the threshold value, extracts the vehicle ahead as the vehicle against which control should be performed and performs driving support control based upon the information from the first vehicle information detecting unit.

The vehicle driving support control apparatus according to the present invention precisely extracts a vehicle ahead, which is a subject against which control should be performed, by suitably reflecting a difference in detecting units detecting vehicle information and a difference in an actual driving condition and driving environment, thereby being capable of performing natural driving support with no sense of discomfort.

DETAILED DESCRIPTION OF THE PREFERRED EMBODIMENT

Hereinafter, an embodiment of the present invention will be described with reference to the drawings.

Figure 1:
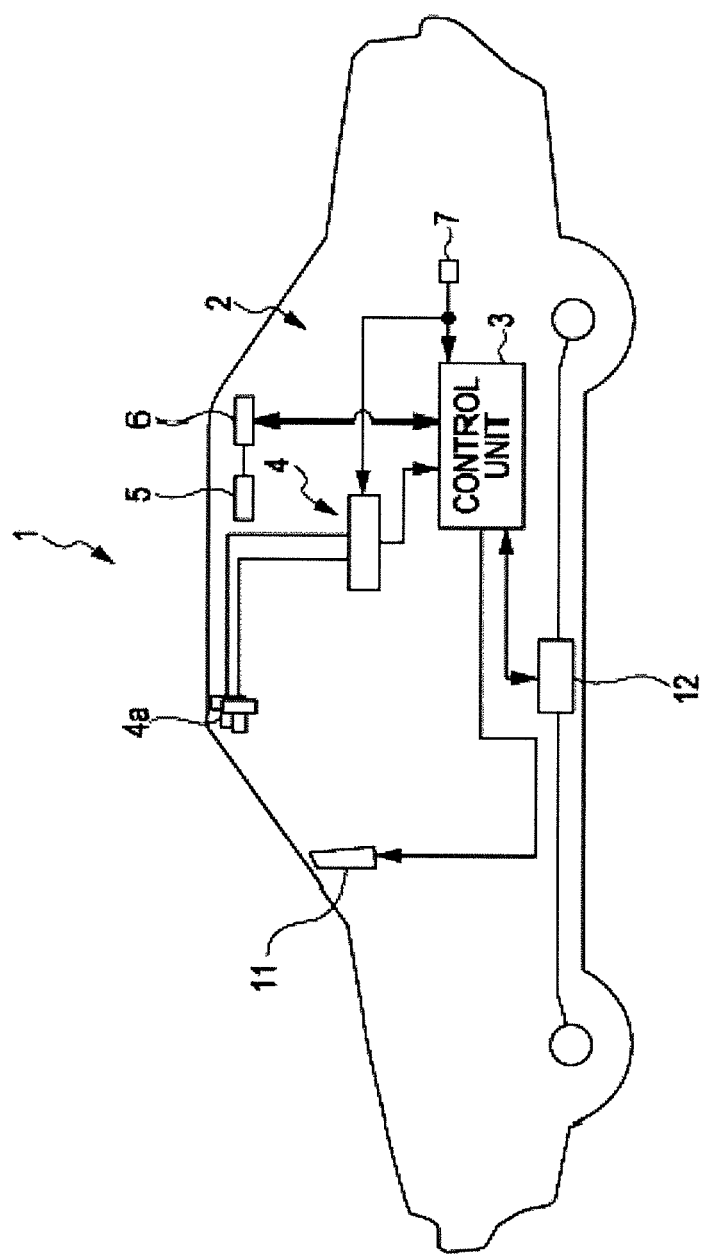
FIG. 1 is a schematic diagram illustrating a configuration of a driving support control apparatus mounted to a vehicle according to a embodiment of the present invention.

In FIG. 1, reference numeral 1 denote a vehicle (own vehicle) such as an automobile, and the vehicle 1 is equipped with a driving support apparatus 2. The driving support apparatus 2 is configured with a control unit 3 that is connected to a stereo image recognition device (front recognition device) 4 that recognizes a front environment based on image data, a communication device 5 that makes inter-vehicle communication with another vehicle so as to acquire the information of the other vehicle, a positioning device 6, and a vehicle speed sensor 7 that detects a speed V of the own vehicle.

The stereo image recognition device (front recognition device) 4 processes image data from a set of (right and left) CCD cameras 4a, which is mounted at the front of a ceiling in a compartment with a certain distance so as to capture a image in stereo of a subject at the outside of the vehicle from a different point of view.

The stereo image recognition device (front recognition device) 4 processes the image from the CCD cameras 4a as described below, for example. Firstly, the stereo image recognition device 4 obtains distance information from a deviation amount of the corresponding positions of a pair of stereo images, captured by the CCD cameras 4a in the travelling direction of the vehicle 1, so as to produce a distance image. The stereo image recognition device 4 then performs a known grouping process based upon this data, and compares the data with frames (windows) of three-dimensional road-configuration data, side-wall data, and three-dimensional-object data that are previously stored. With this process, the stereo image recognition device 4 extracts a configuration of a road (curve, slope), lane-line data, and side-wall data such as a guard rail or a curb present along the road, and extracts the three-dimensional objects as dividing the three-dimensional objects into vehicles and other three-dimensional objects.

The position of each of the above-mentioned recognized data pieces is calculated on a coordinate system in which the vehicle 1 is defined as the origin, the front-to-rear direction of the vehicle 1 is defined as X axis, and the widthwise direction thereof is defined as Y axis. Thus, the distance from the vehicle 1 is calculated. Regarding the three-dimensional-object data, a relative speed with respect to the vehicle 1 is calculated from a temporal change in the distance from the vehicle 1. The information pieces thus obtained, i.e., the road configuration (curve, slope), the lane-line data, the side-wall data such as the guard rail or curb present along the road, and the three-dimensional-object data (type of the three dimensional object such as vehicle and another object, distance from the vehicle 1, position, speed (speed V of the vehicle 1+relative speed), relative speed, etc.), are input to the control unit 3. As described above, the stereo image recognition device (front recognition device) 4 serving as the front information detecting unit is provided as the second vehicle information detecting unit in the present embodiment.

The communication device 5 has a function of acquiring various information pieces, such as traffic jam information, weather information, and traffic restriction information in a specific area, through the reception of light or radiowave beacon from road ancillary equipment, and receiving and transmitting vehicle information from and to another vehicle traveling around the vehicle 1 through the inter-vehicle communication, as a device compatible with ITS (Intelligent Transport Systems), for example. In the inter-vehicle communication in the present embodiment, communication between vehicles present in an area where communication is possible is made by using a carrier signal in a predetermined frequency band, whereby information such as type of vehicle, vehicle position, vehicle direction, vehicle speed, acceleration/deceleration state, brake operating state, ON/OFF state of a hazard switch, and ON/OFF state of a turn signal switch, is exchanged among the vehicles, and the acquired information is input to the control unit 3. Accordingly, the communication device 5 is provided as the first vehicle information detecting unit.

The positioning device 6 is composed of a known navigation device, for example. The positioning device 6 measures the position of the vehicle 1, and calculates and synthesizes the measured position of the vehicle and map information. With this, the positioning device 6 displays on a display 11 a map indicating the current position of the vehicle 1 and its periphery corresponding to the operation input of changing the scale size of the map, displaying a place name in more detail, and changing the display of the area information. Further, the positioning device 6 displays various information pieces, such as road and traffic information, received through the communication device 5. The position of the vehicle 1 is measured based upon the position of the vehicle 1 based upon an electric wave from a positioning satellite such as GPS (Global Positioning System), the position of the vehicle 1 by based upon dead-reckoning navigation based upon signals from a geomagnetic sensor and a wheel speed sensor, and the information acquired from the communication device 5. This positioning information is input to the control unit 3, and transmitted to the other vehicles by the inter-vehicle communication through the communication device 5.

When the control unit 3 detects a vehicle ahead by a stereo image recognition device (front recognition device) 4 based upon the above-mentioned input signals, the control unit 3 extracts the vehicle ahead as a vehicle against which control should be performed, displays an alarm on the display 11 in order to prevent a collision with the vehicle ahead extracted based upon the information from the stereo image recognition device (front recognition device) 4, and outputs a necessary control signal to an automatic brake control device 12 so as to perform driving support control, according to a later-described driving support control program. When the stereo image recognition device (front recognition device) 4 does not detect a vehicle ahead, the control unit 3 sets either one of a distance from the driving lane on which the vehicle 1 travels and a start point of a curve ahead according to the configuration of the road ahead and a detection limit distance of vehicle ahead information by the stereo image recognition device (front recognition device) 4 as a threshold value IVC_L. When the vehicle ahead is distant by more than the threshold value IVC_L, the control unit 3 extracts the vehicle ahead as the vehicle against which control should be performed, and perceptually displays the vehicle ahead on the display 11 based upon the information from the communication device 5 by inter-vehicle communication in order to prevent a collision with the extracted vehicle ahead. Thus, the control unit 3 performs driving support control. As described above, the control unit 3 is configured to have functions of the first driving support control unit and the second driving support control unit.

Figure 2:
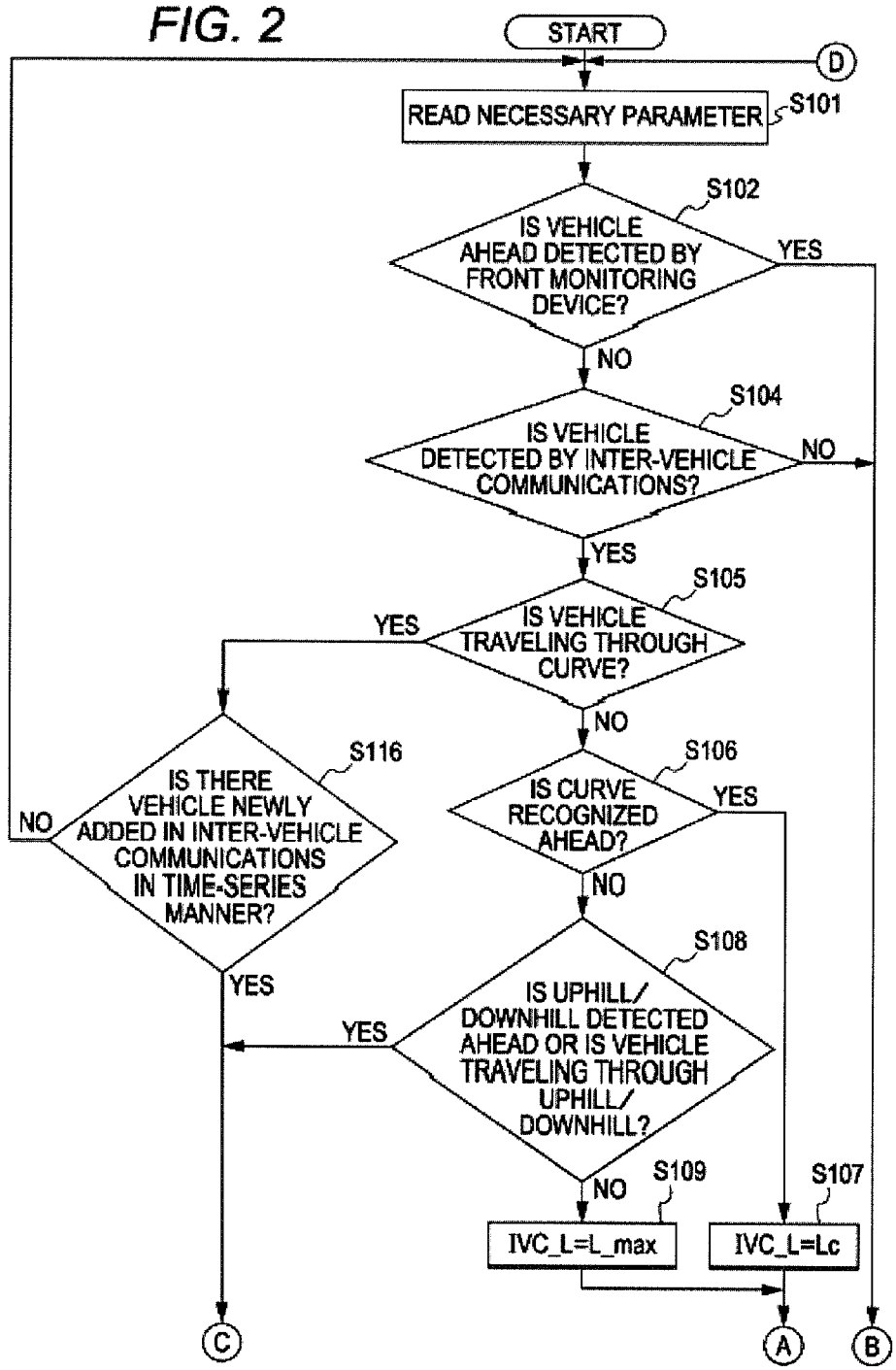
FIG. 2 is a flowchart illustrating a driving support control program according to the embodiment of the present invention.
Figure 3:
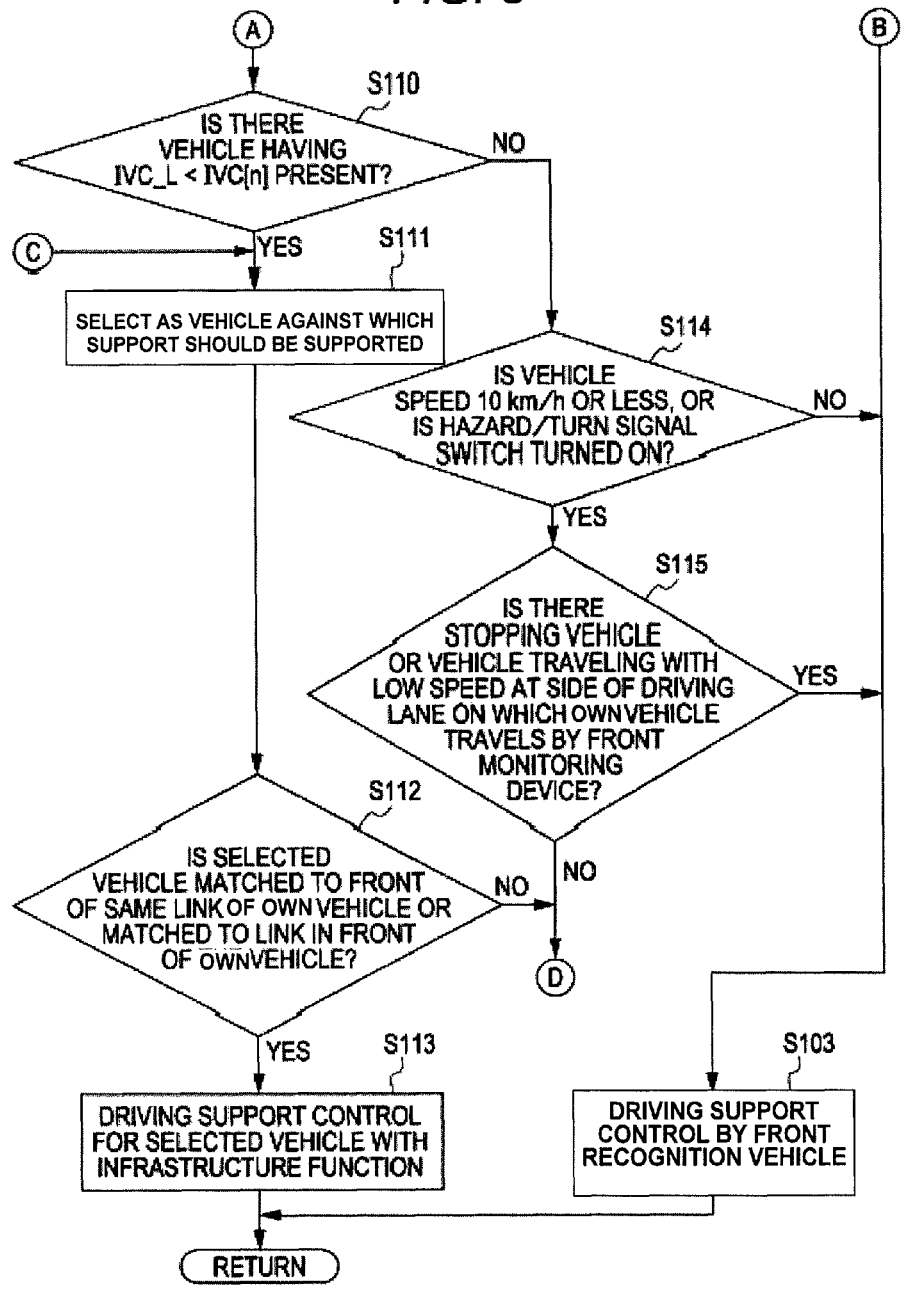
FIG. 3 is a flowchart illustrating a continuation of FIG. 2.

A driving support control program executed by the driving support apparatus 2 will next be described with reference to FIGS. 2 and 3.

In step S101, the driving support apparatus 2 reads necessary parameters, and then, proceeds to step S102 to determine whether a vehicle ahead is detected by the stereo image recognition device (front recognition device) 4 or not. With this process in step S102, whether a vehicle ahead is present or not at the position of, for example, VC[1] in FIG. 4 is detected.

When the vehicle ahead is detected by the stereo image recognition device (front monitoring device) 4 as a result of the determination in step S102, the driving support apparatus 2 proceeds to step S103 to perform driving support control based upon the information from the stereo image recognition device (front recognition device) 4. Then, the driving support apparatus 2 exits the program. Specifically, when the driving support apparatus 2 detects the vehicle ahead as a result of the detection of the vehicle ahead by the stereo image recognition device (front recognition device) 4, it displays an alarm on the display 11 in order to prevent a collision with the vehicle ahead, and outputs a necessary control signal to the automatic brake control device 12, so as to execute driving support control. For example, the driving support apparatus 2 sets a safety distance in front of the vehicle 1 according to the speed V of the vehicle 1. When the vehicle 1 approaches the vehicle ahead by a distance smaller than the safety distance as a result of the comparison between the safety distance and the distance between the vehicle 1 and the vehicle ahead, the driving support apparatus 2 sets and outputs a predetermined brake force.

Figure 4:
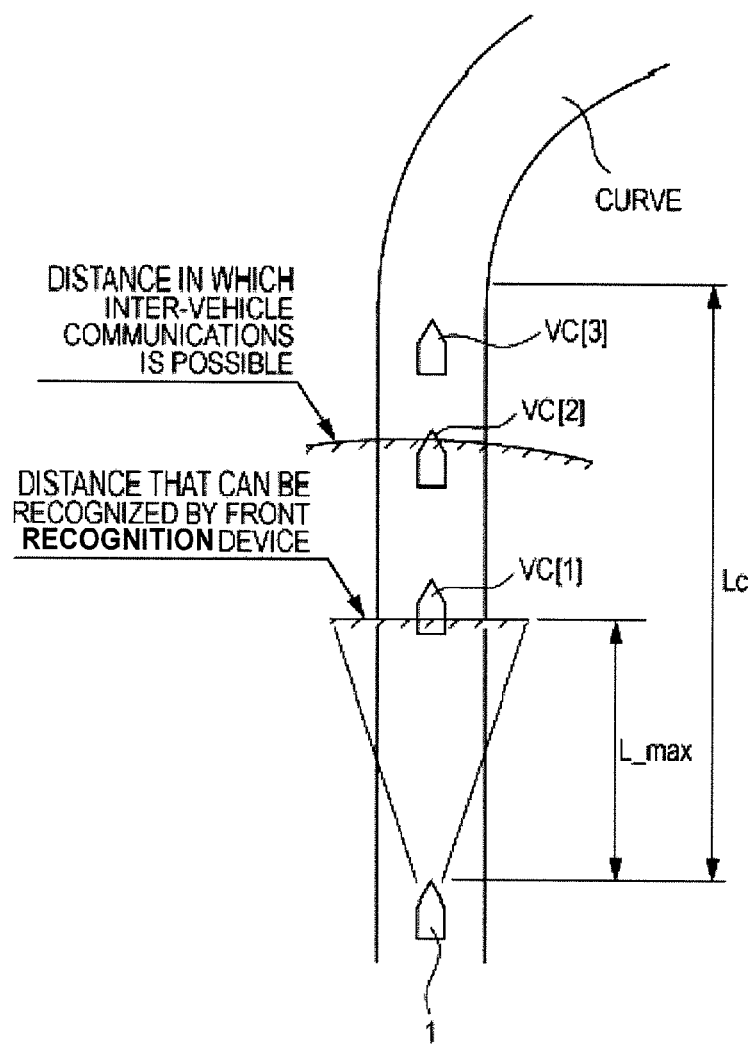
FIG. 4 is an explanatory view illustrating a threshold value according to the embodiment of the present invention.

When a vehicle ahead is not detected by the stereo image recognition device (front recognition device) 4 as a result of the determination in step S102 (for example, a vehicle ahead is located only at a position of VC[2] or VC[3] in FIG. 4, or there is no vehicle ahead), the driving support apparatus 2 proceeds to step S104 to determine whether a vehicle is detected or not by the inter-vehicle communication with the communication device 5. With the process in step S104, it is determined whether or not there is a vehicle ahead at a position such as VC[2] in FIG. 4.

When a vehicle is not detected by the inter-vehicle communication with the communication device 5 as a result of the determination in step S104 (e.g., when a vehicle ahead is located only at the position of VC[3] in FIG. 4, or there is no vehicle ahead), the driving support apparatus 2 proceeds to step S103 to execute driving support control based upon the information from the stereo image recognition device (front recognition device) 4. Then, the driving support apparatus 2 exits the program.

On the other hand, when the driving support apparatus 2 detects a vehicle by the inter-vehicle communication with the communication device 5, it proceeds to step S105 to determine whether the vehicle 1 is traveling through a curve or not. Whether the vehicle 1 is traveling through a curve or not is determined from the steering wheel angle, yaw rate, lateral acceleration of the vehicle 1, and the information from the positioning device 6.

When the driving support apparatus 2 determines that the vehicle 1 is not traveling through a curve as a result of the determination in step S105, it proceeds to step S106 to determine whether a curve is recognized ahead or not. The recognition of a curve is executed based upon, for example, the map information from the positioning device 6, and the road-configuration information from the stereo image recognition device (front recognition device) 4.

When the driving support apparatus 2 determines that a curve is recognized ahead as a result of the determination in step S106, it proceeds to step S107 to set a distance Lc from the vehicle 1 to the start point of the curve ahead as a threshold value IVC_L as illustrated in FIG. 4. Then, the driving support apparatus 2 proceeds to step S110.

When the driving support apparatus 2 does not recognize a curve ahead, it proceeds to step S108 to determine whether an uphill/downhill is detected ahead or not, or whether the vehicle 1 is currently traveling through a uphill/downhill or not. The uphill/downhill detection ahead is executed based upon, for example, the road-configuration information from the stereo image recognition device (front recognition device) 4 and the map information from the positioning device 6. The determination of whether the vehicle 1 is currently traveling through a uphill/downhill is executed based upon, for example, the road-configuration information from the stereo image recognition device (front recognition device) 4, the map information from the positioning device 6, and the information from a longitudinal acceleration sensor.

When an uphill/downhill is not detected ahead, and the vehicle is not traveling through a uphill/downhill as a result of the determination in step S108, the driving support apparatus 2 proceeds to step S109 to set a detection limit distance L_max of vehicle ahead information by the stereo image recognition device (front recognition device) 4 as the threshold value IVC_L as illustrated in FIG. 4, and then, proceeds to step S110.

When the driving support apparatus 2 sets the threshold value IVC_L in step S107 or S109, and then, proceeds to step S110, it compares the threshold value IVC_L and a distance IVC[n] between the vehicle 1 and a vehicle ahead (here, the distance IVC is specific to a vehicle and the suffix [n] indicates that a vehicle to which the data belongs). When the vehicle is distant by more than the threshold value IVC_L (i.e., in the case of IVC_L<IVC [n]), the driving support apparatus 2 proceeds to step S111 to select the vehicle as the vehicle against which support should be performed (the vehicle against which control should be performed). Then, the driving support apparatus 2 proceeds to step S112.

Figure 6A:
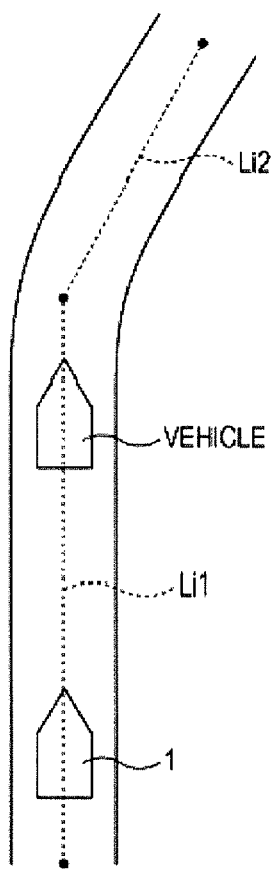
FIG. 6 is an explanatory view illustrating a position of the vehicle and a vehicle ahead on a map according the embodiment of the present invention.
Figure 6B:
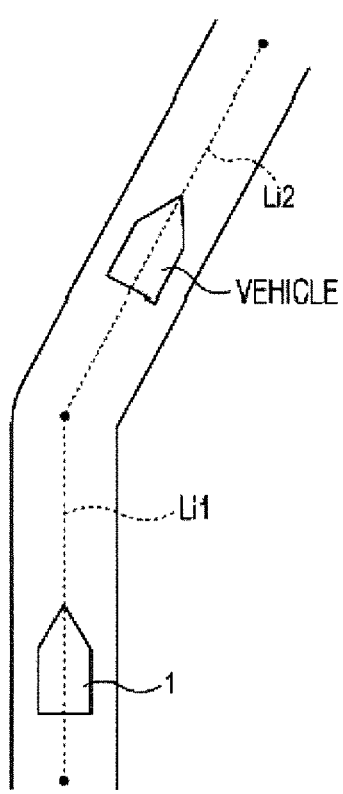

In step S112, the driving support apparatus 2 determines whether the vehicle selected in step S111 is matched to the front of a same link of the vehicle 1 on the map information from the positioning device 6 in which a road is represented by a link Li (i.e., whether the vehicle is present at a front of the link Li1 or not as illustrated in FIG. 6A), or whether the vehicle is matched to a link in front of the vehicle 1 or not (i.e., the vehicle is present on a link Li2 or not as illustrated in FIG. 6B).

When the selected vehicle is matched to the front of the same link of the vehicle 1, or when the selected vehicle is matched to the a link in front of the vehicle 1, the driving support apparatus 2 proceeds to step S113 to execute driving support control with respect to the selected vehicle by a infrastructure function. Thereafter, the driving support apparatus 2 exits the program. In driving support control by the infrastructure function, the vehicle ahead is perceptually displayed on the display 11 in such a manner that the vehicle ahead becomes noticeable based upon the information from the communication device 5.

When the selected vehicle does not match to the front of the same link of the vehicle 1, or when the selected vehicle does not match to the link in front of the vehicle 1 in step S112, the driving support apparatus 2 returns to step S101, since the selected vehicle might be traveling on a road different from the road on which the vehicle 1 is traveling.

When the vehicle is present within the threshold value IVC_L (i.e., in the case of IVC≥IVC[n]) in step S110, the driving support apparatus 2 proceeds to step S114 to determine whether the vehicle travels with low speed (e.g., 10 km/h or less) or not, or whether a hazard switch or a turn signal switch is turned ON or not.

When the vehicle does not travel with low speed (10 km or less) or the hazard switch or the turn signal switch of the vehicle is not turned ON as a result of the determination in step S114, the driving support apparatus 2 proceeds to step S103 to perform driving support control based upon the information from the stereo image recognition device (front recognition device) 4. Then, the driving support apparatus 2 exits the program.

On the other hand, when the vehicle travels with the low speed (10 km/h or less), or the hazard switch or the turn signal switch of the vehicle is turned ON, the driving support apparatus 2 proceeds to step S115 to determine whether there is a vehicle stopping or traveling with low speed at a side of the driving lane on which the vehicle 1 travels by the stereo image recognition device (front recognition device) 4. When it is determined, as a result of the determination, that there is a vehicle stopping or traveling with low speed at a side of the driving lane on which the vehicle 1 travels by the stereo image recognition device (front recognition device) 4, there is a possibility that the vehicle cuts in front of the vehicle 1.

Therefore, the driving support apparatus 2 proceeds to step S103 to perform driving support control based upon the information from the stereo image recognition device (front recognition device) 4. Then, the driving support apparatus 2 exits the program. Specifically, the driving support apparatus 2 can appropriately execute driving support control, considering a case in which the vehicle, which is at a side of the driving lane on which the vehicle 1 travels and is not recognized as a vehicle ahead by the stereo image recognition device (front recognition device) 4 at the beginning, might start and cut in front of the vehicle 1.

When it is determined in step S115 that there is no vehicle stopping or traveling with low speed at a side of the driving lane on which the vehicle 1 travels by the stereo image recognition device (front recognition device) 4, the driving support apparatus 2 returns to step S101.

Figure 7:
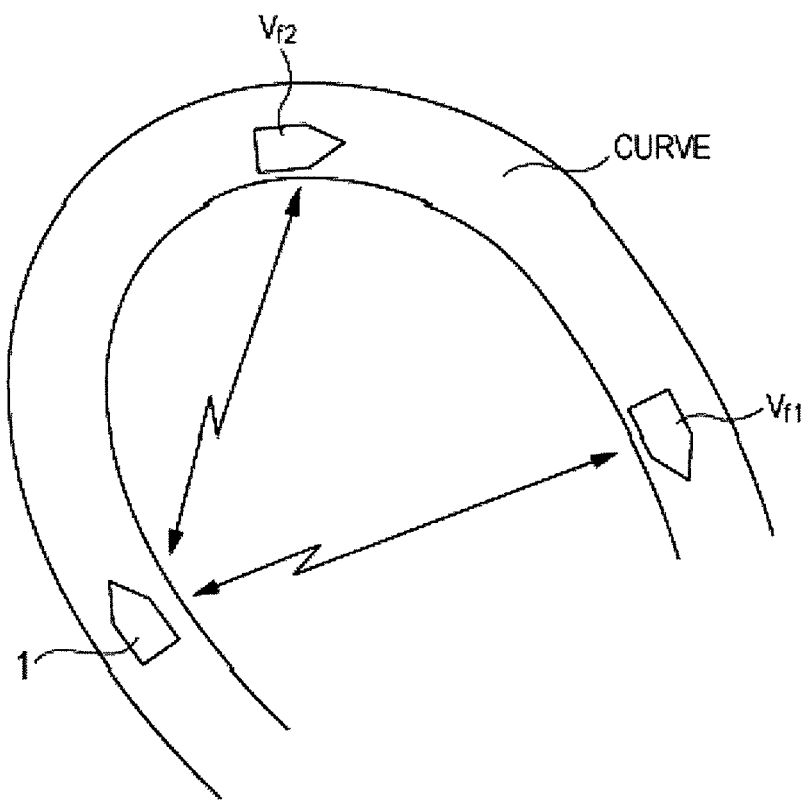
FIG. 7 is an explanatory view illustrating inter-vehicle communications between vehicles during the travel through a curve according to the embodiment of the present invention.

On the other hand, when it is determined that the vehicle 1 is traveling through a curve as a result of the determination in step S105, the driving support apparatus 2 proceeds to step S116 to determine whether or not there is a vehicle that is newly added to the inter-vehicle communication in a time-series manner. For example, as illustrated in FIG. 7, the vehicle 1 makes the inter-vehicle communication with only a vehicle Vf1 at the beginning because of the configuration of the curve, but as the vehicle 1 travels through the curve, the vehicle 1 can make the inter-vehicle communication with an actual vehicle ahead Vf2. Then the vehicle ahead Vf2 is determined to be the vehicle that is newly added to the inter-vehicle communication in a time-series manner. In this case, the driving support apparatus 2 jumps to step S111 so as to immediately select the vehicle Vf2, which is newly added to the inter-vehicle communication in a time-series manner, as the vehicle against which support should be performed (the vehicle against which control should be performed). When the driving support apparatus 2 jumps to step S111 from step S116 to select the vehicle Vf2, which is newly added to the inter-vehicle communication in a time-series manner, as the vehicle against which support should be performed (the vehicle against which control should be performed), there is a possibility that a vehicle behind the vehicle 1 is selected. However, only a vehicle ahead the vehicle 1 can surely be selected by the process in next step S112.

Figure 5:
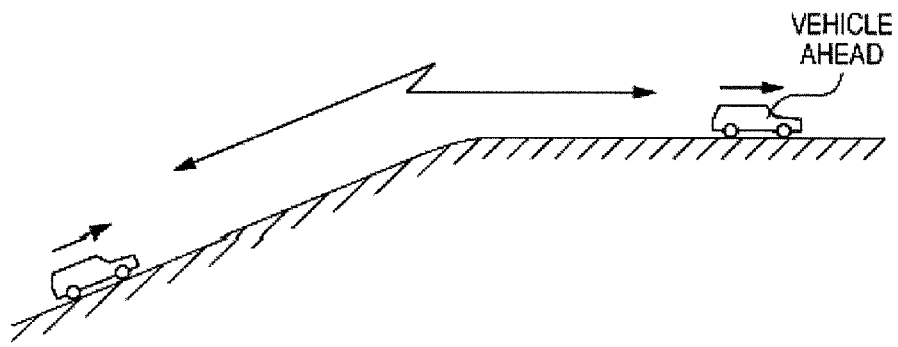
FIG. 5 is an explanatory view of a vehicle information detection when a vehicle travels on a slope according to the embodiment of the present invention.

When a uphill/downhill is detected ahead, or the vehicle 1 is currently traveling through a uphill/downhill, as a result of step S108, the driving support apparatus 2 jumps to S111 to immediately select a vehicle which currently makes the inter-vehicle communication, as the vehicle against which support should be performed (the vehicle against which control should be performed). This is because, as illustrated in FIG. 5, there is a case in which the inter-vehicle communication is possible when the vehicle 1 is traveling through a curve or when a curve is present ahead, even if the vehicle ahead is not detected by the stereo image recognition device (front recognition device) 4. Like above-mentioned step S116, when the driving support apparatus 2 jumps from step S108 to step S111 to select a vehicle which currently makes the inter-vehicle communication, as the vehicle against which support should be performed (the vehicle against which control should be performed), there is a possibility that a vehicle behind the vehicle 1 is selected. However, only a vehicle ahead the vehicle 1 can surely be selected by the process in next step S112.

According to the embodiment of the present invention, when a vehicle ahead is detected by the stereo image recognition device (front recognition device) 4, the vehicle ahead is extracted as a vehicle against which control should be performed, and driving support control is performed based upon the information from the stereo image recognition device (front recognition device) 4. When a vehicle ahead is not detected by the stereo image recognition device (front recognition device) 4, the driving support apparatus 2 sets either one of the distance from the driving lane on which the vehicle 1 travels and a start point of a curve ahead according to the configuration of the road ahead and a detection limit distance of vehicle ahead information by the stereo image recognition device (recognition monitoring device) 4 as a threshold value IVC_L. When the vehicle ahead is present distant by more than the threshold value IVC_L, the driving support apparatus 2 extracts the vehicle ahead as the vehicle against which control should be performed, and performs driving support control based upon the information by the inter-vehicle communication from the communication device 5. Therefore, the driving support apparatus according to the present invention suitably reflects the difference in the detecting units for detecting the vehicle information, such as the detection of the vehicle ahead by the stereo image recognition device (front recognition device) 4 and the detection of the vehicle ahead by the inter-vehicle communication, and the difference in the actual driving condition and driving environment, and precisely extracts the vehicle ahead that is the subject against which control should be performed, whereby a natural driving support with no sense of discomfort can be executed.

What is claimed is:

1. A vehicle driving support control apparatus comprising:
   a first vehicle information detecting unit that acquires vehicle information of a vehicle around an own vehicle by inter-vehicle communication within an inter-vehicle communication first distance;
   a second vehicle information detecting unit that acquires vehicle information, on the basis of images captured by an imaging device in the travelling direction of the own vehicle, as to a vehicle at least up to a second distance ahead of the own vehicle, the second distance being shorter than the first distance; and
   a driving support control unit that, when the second vehicle information detecting unit detects a vehicle ahead, acquires, by the second vehicle information detecting unit, vehicle information of the detected vehicle ahead and performs a driving support control for the own vehicle based upon the vehicle information from the second vehicle information detecting unit, and
   that, the driving support control unit, upon determining that the second vehicle information detecting unit does not detect a vehicle ahead:
   a) initiates reliance on the first vehicle information detecting unit to the exclusion of the second vehicle information detecting unit relative to vehicle ahead extraction for performing driving support control for the own vehicle relative to the extracted vehicle ahead when the inter-vehicle communication first distance is satisfied and a threshold condition is satisfied, and
   b) acquires, by the first vehicle information detecting unit, vehicle information of a vehicle more than a threshold value ahead, the threshold value being selected from either one of a distance to a start point of a curve ahead or the second distance according to the configuration of the driving lane on which the own vehicle travels and the configuration of the road ahead, and when the vehicle ahead is present a distance more than the threshold value, the threshold condition is deemed satisfied and the driving support control unit performs driving support control for the own vehicle based upon the vehicle information from the first vehicle information detecting unit.

2. The vehicle driving support control apparatus according to claim 1, wherein
when it is determined that the own vehicle is not traveling through a curve, and a curve is detected ahead, the driving support control unit sets the distance to the start point of the curve from the vehicle as the threshold value, while, when it is determined that the vehicle is not traveling through a curve, and a curve is not detected ahead, the driving support control unit sets the detection limit distance vehicle ahead information by the second vehicle information detecting unit as the threshold value, in either one of a case in which an uphill and downhill is not detected ahead and a case in which the vehicle is not traveling through an uphill or a downhill.

3. The vehicle driving support control apparatus according to claim 1, wherein
when the own vehicle is traveling through the curve, and when there is a vehicle newly detected by the first vehicle information detecting unit in a time-series manner as the own vehicle advances through the curve, the driving support control unit extracts the newly detected vehicle as the vehicle against which control should be performed, and performs driving support control based upon the information from the first vehicle information detecting unit.

4. The vehicle driving support control apparatus according to claim 1, wherein
when the second vehicle information detecting unit confirms that a vehicle stopping at a side of the driving lane on which the vehicle travels or a vehicle traveling below a preset lower speed at a side of the driving lane on which the vehicle travels is present in case where the driving support control unit determines that the a vehicle ahead is present within the threshold value, and in case where the first vehicle information detecting unit detects any one of an operation of a hazard switch, an operation of a turn signal switch of the vehicle ahead, and a low-speed traveling with a speed lower than a set vehicle speed from the vehicle ahead, the second vehicle information detecting unit extracts the vehicle ahead as the vehicle against which control should be performed, and performs driving support control based upon the information from the second vehicle information detecting unit.

5. A vehicle driving support control apparatus comprising:
a first vehicle information detecting unit that acquires vehicle information of a vehicle around an own vehicle by inter-vehicle communication within an inter-vehicle communication first distance;
a second vehicle information detecting unit that acquires vehicle information, on the basis of images captured by an imaging device in the traveling direction of the own vehicle, as to a vehicle at least up to a second distance ahead of the own vehicle, the second distance being shorter than the first distance; and
a driving support control unit that,
(i) when the second vehicle information detecting unit detects a vehicle ahead, extracts the vehicle ahead as a vehicle against which control should be performed, and performs a driving support control for the own vehicle based upon the vehicle information from the second vehicle information detecting unit, and
(ii) when the second vehicle information detecting unit does not detect a vehicle ahead and the inter-vehicle first distance is as well as a threshold condition is satisfied, initiates reliance on the first vehicle information detecting unit to the exclusion of the second vehicle information detecting unit relative to vehicle ahead extraction for performing driving support control for the own vehicle relative to the extracted vehicle ahead,
determines, upon a triggering condition of the second vehicle information detecting unit not detecting a vehicle ahead, both of threshold values a) and b) and, according to the configuration of the driving lane on which the vehicle travels and the configuration of the road ahead, considers and selects for use one of a) and b) as a selected threshold value;
a) distance to a start point of a curve ahead,
b) the second distance; and,
extracts the vehicle ahead as the vehicle against which control should be performed when the vehicle ahead is present a distance by more than the selected threshold value such that the threshold condition is satisfied and
performs driving support control based upon the information from the first vehicle information detecting unit.

6. The vehicle driving support control apparatus according to claim 5, wherein, when the vehicle ahead is present a distant not more than the selected threshold value, the second vehicle information detecting unit is considered for a determination as to whether the vehicle ahead is travelling at a lower value than a preset speed or whether a hazard or turn signal of the vehicle ahead is detected.

7. The vehicle driving support control apparatus according to claim 5, wherein
when it is determined that the own vehicle is not traveling through a curve, and a curve is detected ahead, the driving support control unit sets the distance to the start point of the curve from the vehicle as the selected threshold value, while, when it is determined that the vehicle is not traveling through a curve, and a curve is not detected ahead, the driving support control unit sets the detection limit distance vehicle ahead information by the second vehicle information detecting unit as the selected threshold value, in either one of a case in which an uphill and downhill is not detected ahead and a case in which the vehicle is not traveling through an uphill or a downhill.

8. The vehicle driving support control apparatus according to claim 5, wherein
when the own vehicle is traveling through the curve, and when there is a vehicle newly detected by the first vehicle information detecting unit in a time-series manner as the own vehicle advances through the curve, the driving support control unit extracts the newly detected vehicle as the vehicle against which control should be performed, and performs driving support control based upon the information from the first vehicle information detecting unit.

9. The vehicle driving support control apparatus according to claim 5, wherein
when the second vehicle information detecting unit confirms that a vehicle stopping at a side of the driving lane on which the vehicle travels or a vehicle traveling below a preset lower speed at a side of the driving lane on which the vehicle travels is present in case where the driving support control unit determines that the vehicle ahead is present within the threshold value, and in case where the first vehicle information detecting unit detects any one of an operation of a hazard switch, an operation of a turn signal switch of the vehicle ahead, and a low-speed traveling with a speed lower than a set vehicle speed from the vehicle ahead, the second vehicle information detecting unit extracts the vehicle ahead as the vehicle against which control should be performed, and performs driving support control based upon the information from the second vehicle information detecting unit.

* * * * *